June 18, 1929.  L. C. WILLIAMS  1,717,536
AUTOMOBILE VISION ATTACHMENT
Filed Aug. 1, 1927  2 Sheets-Sheet 1
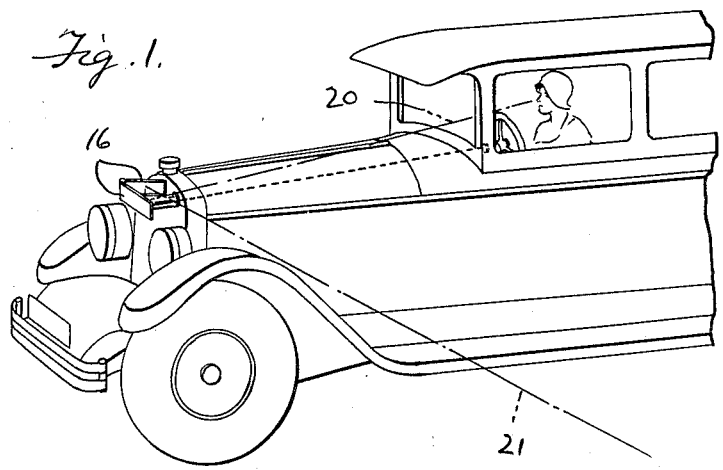
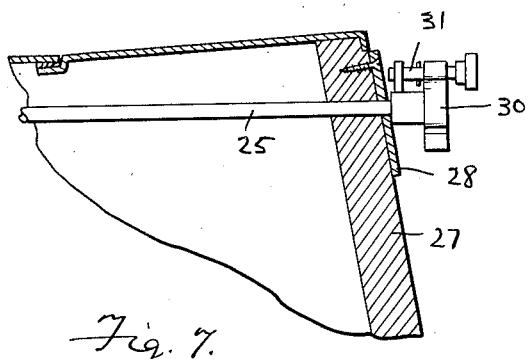
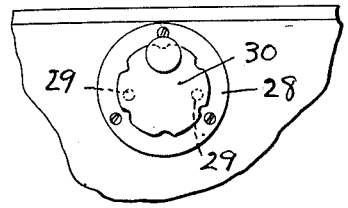
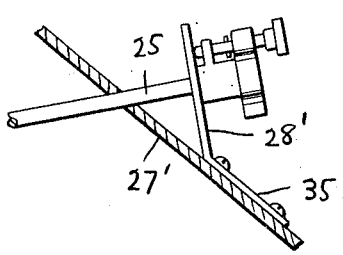
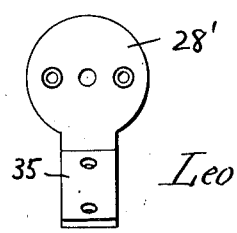
Inventor
Leonard C. Williams
By Clarence A. O'Brien
Attorney June 18, 1929.  L. C. WILLIAMS  1,717,536
AUTOMOBILE VISION ATTACHMENT
Filed Aug. 1, 1927  2 Sheets-Sheet 2
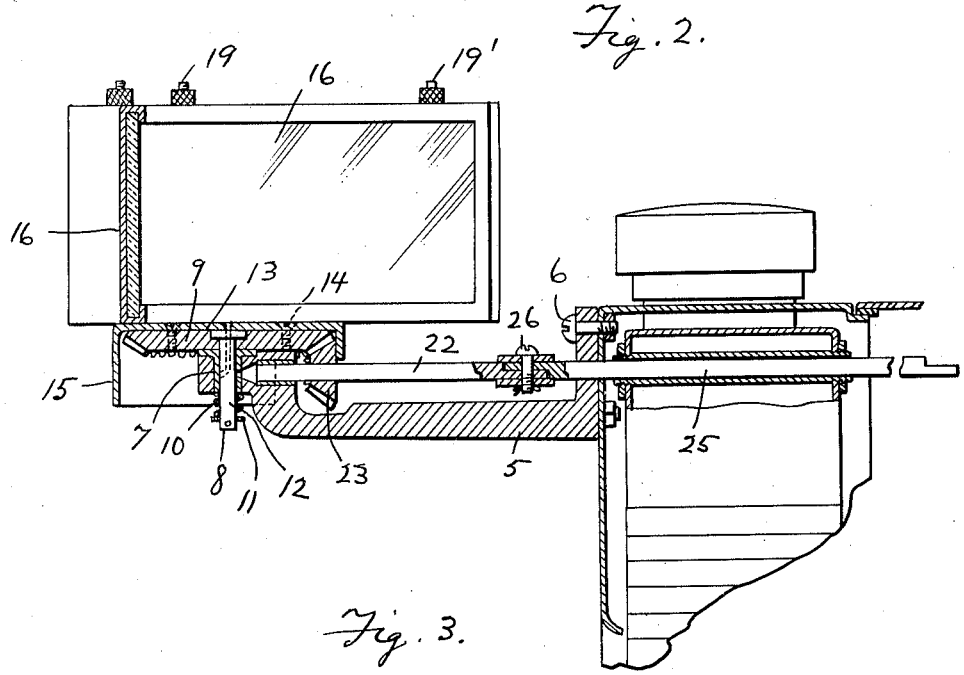
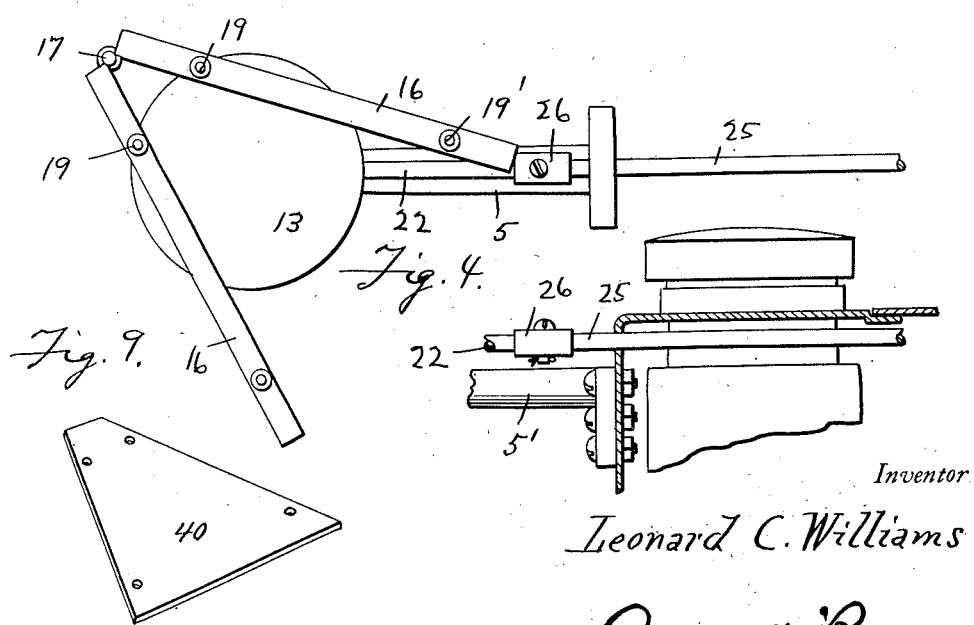
Inventor
Leonard C. Williams
By Clarence A. O'Brien
Attorney Patented June 18, 1929.

1,717,536

UNITED STATES PATENT OFFICE.

LEONARD C. WILLIAMS, OF WEST PITTSTON, PENNSYLVANIA.

AUTOMOBILE VISION ATTACHMENT.

Application filed August 1, 1927. Serial No. 209,816.

The present invention relates to an attachment for automobiles to increase the vision of the operator thereof, particularly at intersections, railroad crossings, road curves, and other like places.

Another important object of the invention lies in the provision of a mirror structure which may be mounted on the front of the automobile and controlled from the dash of the automobile by the operator so as to give visibility to the sides of the automobile as may be desired so as to greatly increase the visibility of the driver and thereby eliminate the danger of accidents and enabling the car to be driven in a safer and more efficient manner.

A still further very important object of the invention resides in the provision of an attachment of this nature which is exceedingly simple in its construction, easy to operate, thoroughly efficient and reliable, inexpensive to manufacture, and otherwise well adapted to the purposes for which it is designed.

With the above and numerous objects in view as will appear as the description proceeds, the invention resides in certain novel features of construction, and in the combination and arrangement of parts as will be hereinafter more fully described and claimed.

In the drawing:—

Figure 1 is a fragmentary perspective view of an automobile showing my attachment applied thereto.

Figure 2 is an enlarged detail sectional view through a radiator showing the attachment mounted thereon, Figure 3 is a top plan view of the attachment, Figure 4 is a view showing the radiator fragmentarily in section and a different embodiment of bracket, Figure 5 is a sectional view through the dash showing the control of the attachment, Figure 6 is an elevation of the structure shown in Figure 5, Figure 7 is a view similar to Figure 5 showing a different embodiment, Figure 8 is an elevation of the dash plate shown in Figure 7, Figure 9 is a perspective view of a cover which may be used on the mirrors.

Referring to the drawing in detail it will be seen that the numeral 5 denotes a bracket arm which may be secured to the front of the radiator by bolts 6 or in any other suitable manner. The numeral 5' denotes another embodiment of the bracket which may be used to advantage with the different embodiments of the control of the attachment. On the forward end of the bracket 5, 5' which is curved upwardly, there is provided an opening in which is situated a bushing 7 that rotatably receives the pin 8 on which is mounted a bevel gear 9. The pin is held in place by means of a spring 10 and an anchoring structure such as washer 11 and a pin 12.

A disc 13 is mounted on the gear 9 by means of screws 14 or in any other suitable manner and has a depending peripheral flange or apron 15. A pair of mirrors 16 are hinged together as at 17 and are anchored to the disc plate 13 by suitable bolts or other fastening means 19 so as to be held at an acute angle to each other as is clearly indicated in Figure 3 for providing vision such as is indicated to advantage in Figure 1 by the lines 20 and 21. A shaft 22 is journaled in the end of the bracket 5, 5' and has a bevel pinion 23 thereon which meshes with the gear 19. Obviously, by turning the shaft 22 the gear 9 may be turned and the mirror situated as shown in Figure 3 or in a position to see to the other side of the car as is quite apparent. This shaft has an extension 25 engaged therewith as at 26 and this extension is disposed through a core of the radiator as in Figure 2 or above the core of the radiator as in Figure 4 depending upon the style of the radiator. This extension 25 extends back through an opening in the dash 27 as shown in Figure 5. A plate 28 is fixed to the dash and has a central opening through which the extension 25 is rotatable. This plate 28 will be formed with openings or indentures 29. A knob 30 is on the inner end of the extension 25 and has a pin 31 slidable therethrough which may be inserted in one of the openings or indentures 29 to hold the mirrors in the desired adjusting position.

Some dashes will require a plate 28' as is shown in Figures 7 and 8 which will be formed with a shank extension 35 fixed to the dash so that the plate 28' is disposed at an angle thereto, rather than right up against the same as in the modification shown in Figures 5 and 6.

It will be seen from the above detailed description that this device is useful on automobiles and like vehicles for increasing the visibility of the driver since the mirrors may be adjusted so as to allow the driver to see the various sideward directions from the automobile thereby allowing the automobile to be driven more safely and more efficiently. The device is very easily controlled and may be set in its different adjusted positions at a moment's notice.

The present embodiments of the invention have been disclosed in detail merely by way of example since in actual practice it attains the features of advantage enumerated as desirable in the statement of the invention and the above description. It is apparent that numerous changes in the details of construction, and in the combination and arrangement of parts may be resorted to without departing from the spirit or scope of the invention as hereinafter claimed or sacrificing any of its advantages. If desired, a cover plate 40 may be used such as shown in Figure 7 and may be secured on the top of the mirrors by means of bolts 19 and additional bolts 19'.

Having thus described my invention, what I claim as new is:—

1. In an automobile attachment of the class described, a supporting bracket having offset ends, a shaft journaled in the offset ends, a gear, means rotatably mounting the gear on one offset end with the axis at right angles to the shaft, a gear on the shaft meshing with the first mentioned gear, mirror means mounted on the first mentioned gear, and means for fastening the bracket to the radiator of the automobile.

2. In an automobile attachment of the class described, a supporting bracket having offset ends, a shaft journaled in the offset ends, one of said offset ends having a lateral extension aligned with the shaft, a shaft journaled transversely of the lateral extension, a gear on the second mentioned shaft, mirror means mounted on the gear, a gear on the first mentioned shaft meshing with the first mentioned gear, and means for fastening the bracket to the radiator of the automobile.

In testimony whereof I affix my signature.

LEONARD C. WILLIAMS.